United States Patent
Ikebukuro et al.

(10) Patent No.: US 10,477,847 B2
(45) Date of Patent: Nov. 19, 2019

(54) ROLLER CLUTCH FOR FISHING REEL

(71) Applicant: Shimano Inc., Sakai, Osaka (JP)

(72) Inventors: Satoshi Ikebukuro, Osaka (JP); Kei Saito, Osaka (JP); Takuji Takamatsu, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/955,424

(22) Filed: Apr. 17, 2018

(65) Prior Publication Data
US 2019/0029242 A1     Jan. 31, 2019

(30) Foreign Application Priority Data
Jul. 25, 2017 (JP) ................ 2017-143864

(51) Int. Cl.
*A01K 89/01*     (2006.01)
*F16D 41/067*     (2006.01)

(52) U.S. Cl.
CPC ..... *A01K 89/01121* (2015.05); *A01K 89/0111* (2013.01); *A01K 89/01082* (2015.05); *F16D 41/067* (2013.01)

(58) Field of Classification Search
CPC .......... A01K 89/0117; A01K 89/01082; A01K 89/027; F16D 41/067
See application file for complete search history.

(56) References Cited

U.S. PATENT DOCUMENTS

| | | | | | |
|---|---|---|---|---|---|
| 6,019,301 | A | * | 2/2000 | Hitomi | A01K 89/0117 242/247 |
| 6,050,512 | A | * | 4/2000 | Jung | A01K 89/0117 242/247 |
| 6,644,579 | B2 | * | 11/2003 | Hong | A01K 89/0117 242/247 |
| 2009/0057461 | A1 | * | 3/2009 | Hayashi | F16D 41/067 242/247 |
| 2015/0090821 | A1 | * | 4/2015 | Takamatsu | A01K 89/0117 242/243 |

FOREIGN PATENT DOCUMENTS

JP     9-289850 A     11/1997

OTHER PUBLICATIONS

GB Search Report of corresponding GB patent Application No. 1810820.9 dated Dec. 19, 2018.

* cited by examiner

*Primary Examiner* — Emmanuel M Marcelo
(74) *Attorney, Agent, or Firm* — Global IP Counselors, LLP

(57) ABSTRACT

A roller clutch includes an outer ring, an inner ring, a rollers, a torsion spring, and a housing member. The roller is disposed between the inner ring and the outer ring. The roller i configured to move between a transmitting position and a non-transmitting position. The spring biases the roller to the transmitting position. The housing member has a housing hole and an inner wall surface. The housing hole houses the torsion spring. The inner wall surface defines the housing hole and is configured to support the torsion spring.

10 Claims, 5 Drawing Sheets

ROLLER CLUTCH FOR FISHING REEL

CROSS-REFERENCE TO RELATED APPLICATIONS

This application claims priority to Japanese Patent Application No. 2017-143864, filed on Jul. 25, 2017. The entire disclosure of Japanese Patent Application No. 2017-143864 is hereby incorporated herein by reference.

BACKGROUND

Field of the Invention

The present invention relates to a roller clutch for a fishing reel.

A roller clutch for a fishing reel has an outer ring, an inner ring, and rollers, and can transmit rotation only in one direction. For example, when the rollers move to a transmitting position, the rotation of the inner ring is transmitted to the outer ring, and when the rollers move to a non-transmitting position, the rotation of the inner ring is not transmitted to the outer ring.

Background Art

The rollers are biased to the transmitting position by a biasing member. For example, in the roller clutch shown in Japanese Laid-Open Patent Publication No. Hei 9(1997)-289850, torsion springs bias the rollers to the transmitting position. This torsion spring is held by a housing member. In particular, a protruding portion formed in the housing member is inserted into a coil portion of the torsion spring.

SUMMARY

In the configuration described above, it is necessary to form a protrusion to be inserted into the coil portion of the torsion spring in the housing member. This structure can result in problems as the molded housing housing deteriorates. Therefore, an object of the present invention is to prevent deterioration of the molded housing member.

The roller clutch for a fishing reel according to one aspect of the present invention comprises an outer ring, an inner ring, a roller, a torsion spring, and a housing member. The inner ring is disposed on the radially inner side of the outer ring. The roller is disposed between the inner ring and the outer ring. In addition, the roller is capable of moving between a transmitting position and a non-transmitting position. In the transmitting position, the roller transmits power between the outer ring and the inner ring. Additionally, in the non-transmitting position, the roller prevents the transmission of power. The torsion spring biases the roller to the transmitting position. The housing member has a housing hole and an inner wall surface. The housing hole houses the torsion spring. The inner wall surface defines the housing hole and is configured to support the torsion spring.

According to this configuration, instead of supporting the torsion spring with a protruding portion, the torsion spring is supported by the inner wall surface of the housing hole. In this configuration, because it is not necessary to form a protruding portion to support the torsion spring in the housing member, it is possible to prevent deterioration of the molded housing member. Another advantage is the ease of assembly.

Preferably, the bottom surface of the housing hole is a flat surface.

Preferably, the inner wall surface that defines the housing hole is continuous.

Preferably, the torsion spring comprises a coil portion and first and second arm portions that extend from the coil portion. The housing hole comprises a cylindrical portion that houses the coil portion and an extending portion that extends from the cylindrical portion and houses the first arm portion.

Preferably, the outer ring is disposed so as to seal the opening end surface of the housing hole.

According to the present invention, it is possible to prevent deterioration of the molded housing member.

DETAILED DESCRIPTION OF THE EMBODIMENTS

An embodiment of the roller clutch according to the present invention will be described below with reference to the drawings. Meanwhile, in the following description, the axial direction is the direction in which a rotational axis O of a rotor 15 extends, the radial direction is the radial direction of a circle centered on the rotational axis O, and the circumferential direction is the circumferential direction of the circle centered on the rotational axis O.

Spinning Reel

Figure 1:
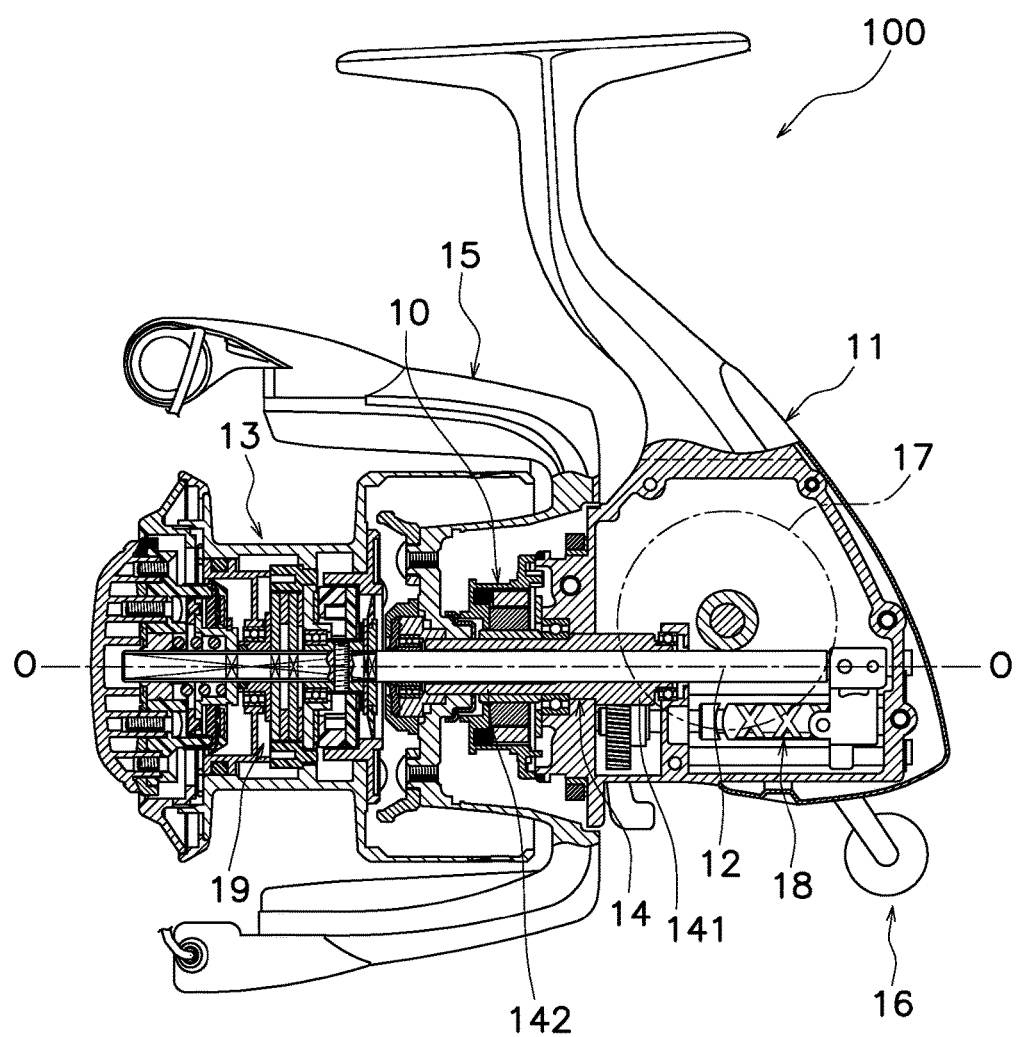
FIG. 1 is a cross-sectional view of a spinning reel.

As shown in FIG. 1, the spinning reel 100 unspools a fishing line forward (the left direction in FIG. 1). The spinning reel 100 comprises a reel body 11, a spool shaft 12, a spool 13, a pinion gear 14, a rotor 15, a handle 16, and a roller clutch 10.

Reel Body

The reel body 11 comprises an internal space and houses various mechanisms in the internal space. For example, a drive gear 17 and an oscillating mechanism 18 are housed in the reel body 11. In addition, a handle 16 is rotatably attached to the side surface of the reel body 11.

The drive gear 17 is rotated by rotating the handle 16. The drive gear 17 is a face gear that meshes with a gear portion 141 of the pinion gear 14. The oscillating mechanism 18 is a mechanism for reciprocating the spool shaft 12 in the axial direction.

Spool Shaft

The spool shaft 12 is disposed on the reel body 11. In particular, the spool shaft 12 extends forward from inside the reel body 11. The spool shaft 12 is reciprocated in the longitudinal direction by rotating the handle 16. More specifically, the rotation of the handle 16 reciprocates the spool shaft 12 in the longitudinal direction via the drive gear 17 and the oscillating mechanism 18.

Spool

The spool 13 is a member around which a fishing line is wound. The spool 13 is mounted to the distal end portion of the spool shaft 12 via a drag mechanism 19. The spool 13 is integrally reciprocated with the spool shaft 12 in the longitudinal direction.

Pinion Gear

The pinion gear 14 is disposed on the reel body 11. In particular, the pinion gear 14 extends forward from the inside of the reel body 11. The pinion gear 14 is rotatably disposed around the spool shaft 12. The pinion gear 14 is formed in a tubular shape, and the spool shaft 12 extends inside the pinion gear 14. The pinion gear 14 is preferably supported by the reel body 11 via a plurality of axle bearings, such that the inner perimeter surface of the pinion gear 14 and the outer perimeter surface of the spool shaft 12 do not come in contact with each other.

The pinion gear 14 comprises a gear portion 141 and an attaching portion 142. The gear portion 141 is positioned on the rear portion of the pinion gear 14 and meshes with the drive gear 17. The attaching portion 142 is positioned on the front portion of the pinion gear 14. Various members are attached to the attaching portion 142. The attaching portion 142 of the pinion gear 14 is formed in a cylindrical shape and has a pair of flat surfaces formed on the outer perimeter surface. The flat surfaces extend in the axial direction and are parallel to each other.

Rotor

The rotor 15 is a member for winding the fishing line around the spool 13. The rotor 15 is fixed to the pinion gear 14 and is integrally rotated together with the pinion gear 14. That is, the rotor 15 is non-rotatable relative to the pinion gear 14. The rotor 15 is attached to the attaching portion 142 of the pinion gear 14.

Roller Clutch

The roller clutch 10 is configured to transmit power only in one direction. That is, the roller clutch 10 is configured as a one-way clutch.

Figure 2:
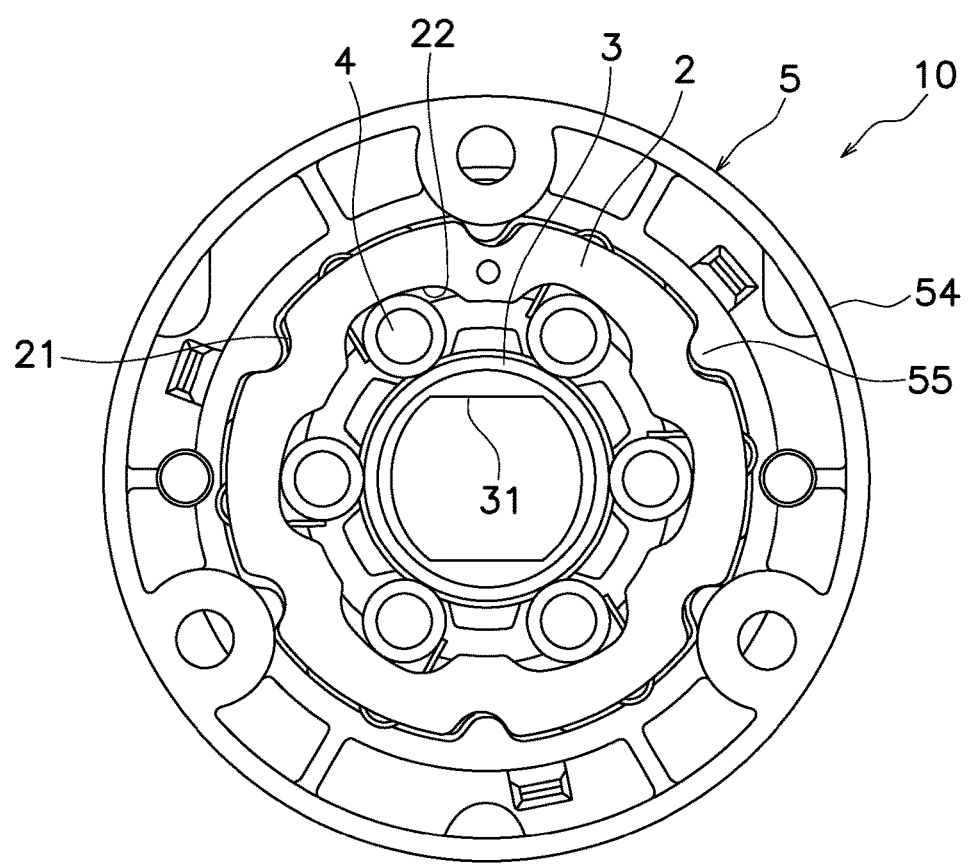
FIG. 2 is a frontal view of the roller clutch.
Figure 3:
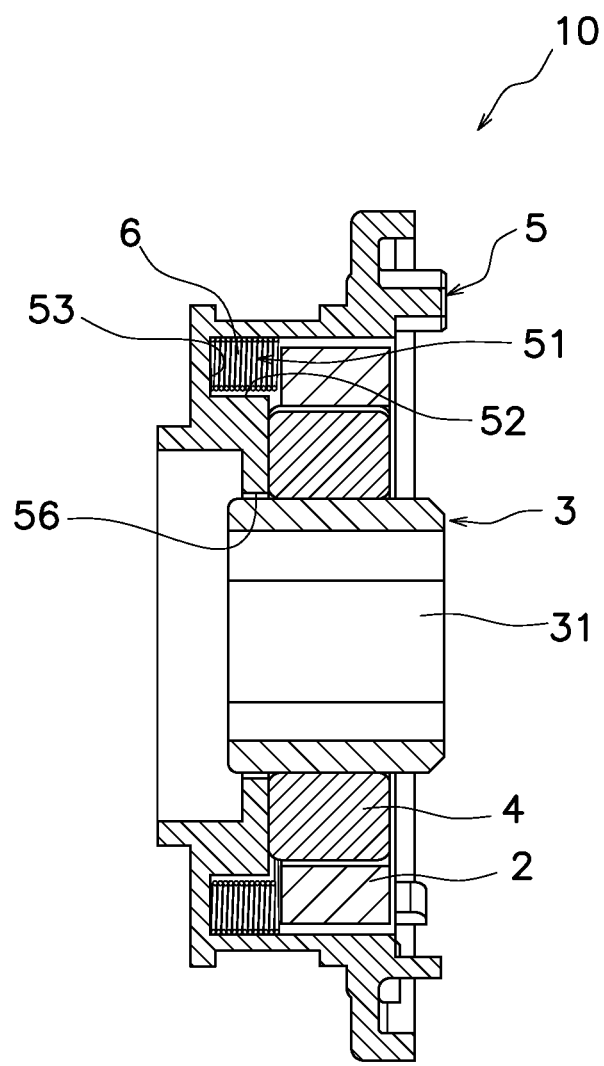
FIG. 3 is a lateral cross-sectional view of the roller clutch.

As shown in FIG. 2 and FIG. 3, the roller clutch 10 comprises an outer ring 2, an inner ring 3, a plurality of rollers 4, a housing member 5, and a plurality of torsion springs 6.

Housing Member

The housing member 5 is fixed to the reel body 11. Specifically, the housing member 5 is fixed to the reel body 11 using bolts or the like. Accordingly, the housing member 5 does not rotate around the rotational axis O.

Figure 5:
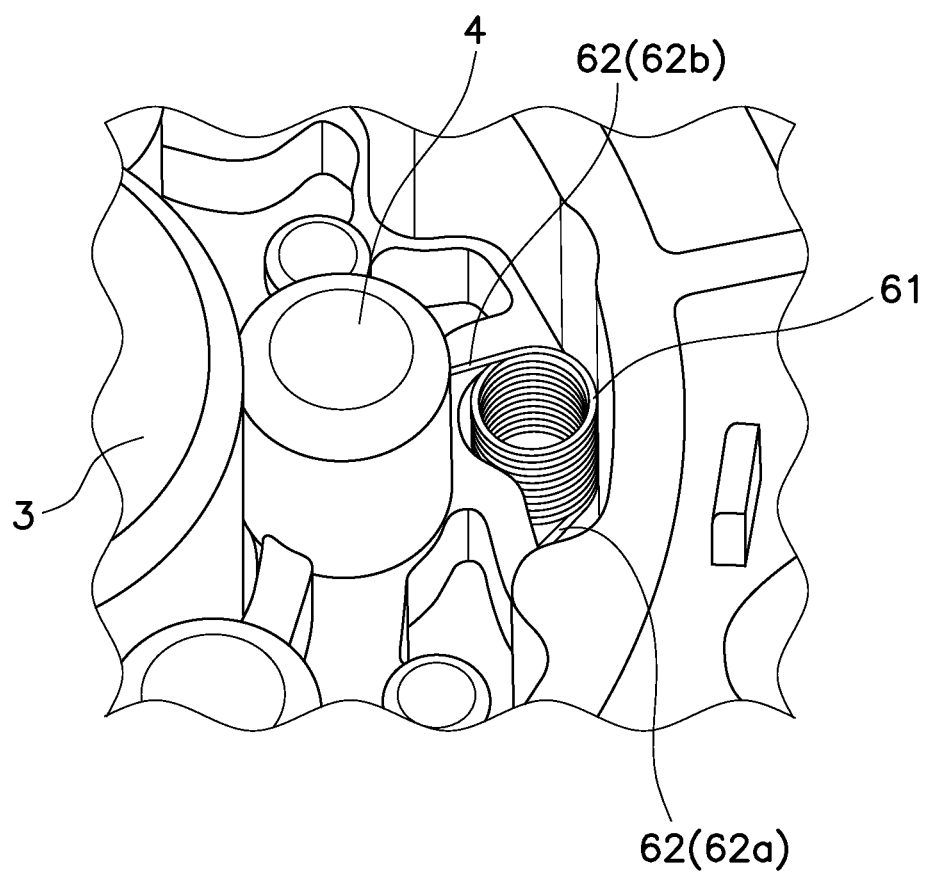
FIG. 5 is an enlarged perspective view of the roller clutch in a state in which the outer ring is removed.

As shown in FIG. 3 and FIG. 5, the housing member 5 comprises at least one and preferably a plurality of housing holes 51. Each housing hole 51 houses a torsion spring 6. The housing holes 51 are disposed at intervals in the circumferential direction. The housing holes 51 do not extend through in the axial direction. That is, each housing hole 51 is a recessed portion.

Figure 4:
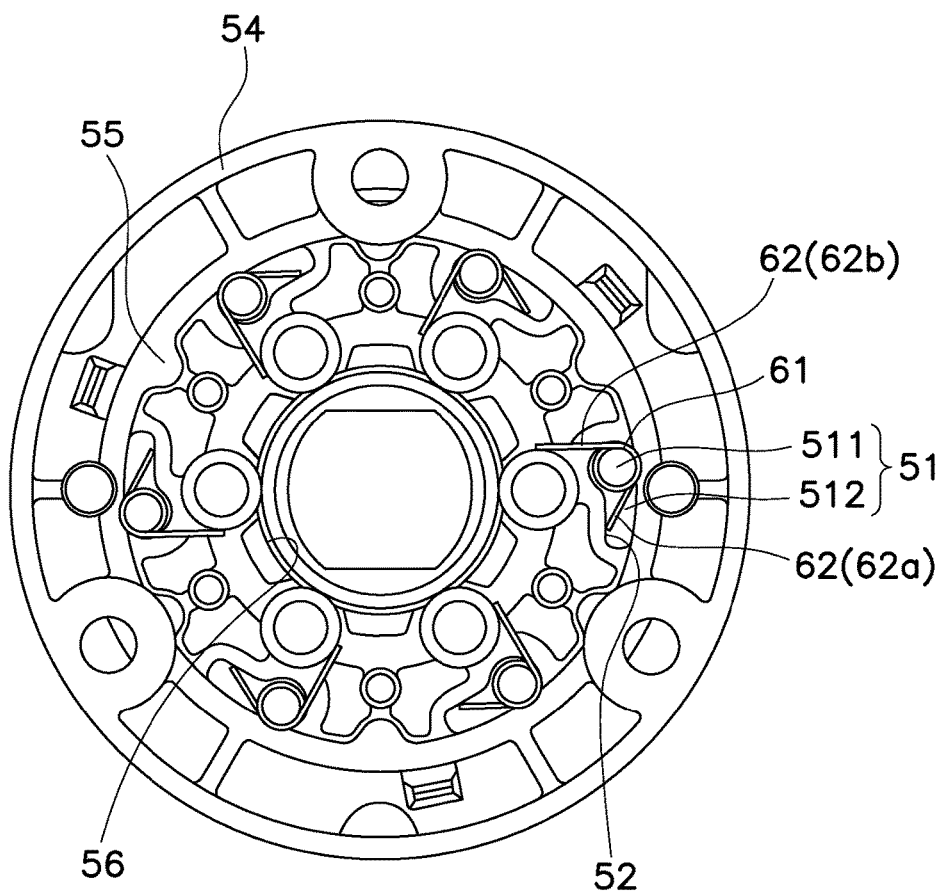
FIG. 4 is a frontal view of the roller clutch in a state in which the outer ring is removed.

Each housing hole 51 is defined by the inner wall surface 52 and a bottom surface 53. As shown in FIG. 4, the inner wall surface 52 is continuous. That is, as viewed from the front, the inner wall surface 52 is connected over the entire circumference thereof and is formed in an annular shape. Accordingly, the housing hole 51 is closed excluding the opening end surface.

As shown in FIG. 3, the bottom surface 53 defines one end surface of the housing hole 51 in the axial direction. This bottom surface 53 is a flat surface. That is, a protruding portion, or the like, is not formed on the bottom surface 53. The other end of each housing hole 51 in the axial direction is opened.

As shown in FIG. 4, each housing hole 51 comprises a cylindrical portion 511 and an extending portion 512. The extending portion 512 extends from the cylindrical portion 511 in the circumferential direction. The cylindrical portion 511 and the extending portion 512 are integrally formed. The cylindrical portion 511 is the portion that houses the coil portion 61, to be described later, and the extending portion 512 is the portion that houses the arm portion 62, to be described later.

In addition, as shown in FIG. 3 and FIG. 4, the housing member 5 comprises an outer peripheral wall portion 54, a plurality of engagement protrusions 55, and a through-hole 56. The outer peripheral wall portion 54 is formed in an annular shape centered on the rotational axis O. Each engagement protrusion 55 protrudes from this outer peripheral wall portion 54 radially inward. Additionally, each engagement protrusion 55 extends in the axial direction. The engagement protrusions 44 are disposed at intervals from each other in the circumferential direction. The through-hole 56 is formed in the central portion of the housing member 5 and extends in the axial direction.

Inner Ring

As shown in FIG. 2 and FIG. 3, the inner ring 3 is disposed on the radially inner side of the outer ring 2. Specifically, the inner ring 3 extends inside the through-hole 56 of the housing member 5. The inner ring 3 has a cylindrical shape and is attached to the attaching portion 142 of the pinion gear 14. A pair of engagement surfaces 31 is formed on the inner perimeter surface of the inner ring 3. Each engagement surface 31 of the inner ring 3 engages with each flat surface of the attaching portion 142 of the pinion gear 14. As a result, the inner ring 3 is integrally rotated together with the pinion gear 14.

Outer Ring

As shown in FIG. 2, the outer ring 2 is formed in a substantially cylindrical shape and has a plurality of engagement recesses 21 on the outer perimeter surface. Each engagement recess 21 of the outer ring 2 engages with an engagement protrusion 55 of the housing member 5. As a result, the outer ring 2 is non-rotatable relative to the housing member 5. Because the housing member 5 is non-rotatable around the rotational axis O, the outer ring 2 is also non-rotatable around the rotational axis O.

The outer ring 2 is disposed so as to seal the opening end surface of each housing hole 51. Accordingly, the outer ring 2 prevents the torsion spring 6 housed in each housing hole 51 from coming out of the housing hole 51. Additionally, the outer ring 2 is supported in the radial direction by the outer peripheral wall portion 54 of the housing member 5.

The outer ring 2 comprises a plurality of cam surfaces 22. Each cam surface 22 is formed on the inner perimeter surface of the outer ring 2. The distance between each cam surface 22 and the rotational axis O changes along the circumferential direction. Specifically, each cam surface 22 is inclined so as to approach the rotational axis O in the clockwise direction as shown in FIG. 2.

Roller

The rollers 4 are disposed between the inner ring 3 and the outer ring 2. Specifically, the rollers 4 are disposed between the outer perimeter surface of the inner ring 3 and the cam surfaces 22 of the outer ring 2. The rollers 4 are disposed at intervals from each other in the circumferential direction. The rollers 4 have a cylindrical shape and extend along the rotational axis O. The rollers 4 can move between a transmitting position and a non-transmitting position. The rollers 4 are biased to the transmitting position by the torsion springs 6.

The distance between the outer perimeter surface of the inner ring 3 and the cam surface 22 of the outer ring 2 in the transmitting position is less than the diameter of the rollers 4. Accordingly, when the rollers 4 are moved to the transmitting position, the rollers 4 dig in between the outer perimeter surface of the inner ring 3 and the cam surface 22 of the outer ring 2. As a result, the rollers 4 transmit power between the inner ring 3 and the outer ring 2.

In the present embodiment, because the outer ring 2 is non-rotatable around the rotational axis O, the inner ring 3 is also non-rotatable around the rotational axis O when the roller 4 moves to the transmitting position. Specifically, when attempting to turn the handle 16 in the line feeding direction, the inner ring 3 is rotated clockwise as shown in FIG. 2, and the rollers 4 move to the transmitting position. Accordingly, the inner ring 3 is non-rotatable, and, as a result, the handle 16 cannot be turned in the casting (line-delivery) direction.

The distance between the outer perimeter surface of the inner ring 3 and the cam surface 22 of the outer ring 2 in the non-transmitting position is greater than the diameter of the rollers 4. Accordingly, when the rollers 4 move to the non-transmitting position, the rollers 4 are rotatable between the outer ring 2 and the inner ring 3. As a result, the power of the inner ring 3 is not transmitted to the outer ring 2. That is, the inner ring 3 becomes rotatable. Specifically, when the handle 16 is turned in the line-winding direction, the inner ring 3 is rotated counterclockwise as shown in FIG. 2, and the rollers 4 move to the non-transmitting position. Accordingly, the handle 16, the inner ring 3, the pinion gear 14, and the rotor 15 become rotatable in the line-winding direction.

Torsion Spring

As shown in FIG. 4, the torsion springs 6 are configured to bias the rollers 4 inwards toward the transmitting position side. The torsion springs 6 are housed in the housing holes 51 of the housing member 5. The torsion springs 6 are supported on the inner wall surface 52 that defines the housing holes 51.

The torsion spring 6 comprises a coil portion 61 and a pair of arm portions 62. The coil portion 61 is the portion of the torsion spring 6 that is wound into a coil shape. The coil portion 61 is housed in the cylindrical portion 511 of the housing hole 51.

The pair of arm portions 62 extends from the coil portion 61. The pair of arm portions 62 includes a first arm portion 62a and a second arm portion 62b. The first arm portion 62a is disposed in the extending portion 512. This first arm portion 62a abuts the inner wall surface 52 inside the extending portion 512.

In addition, of the pair of arm portions 62, the second arm portion 62b biases the roller 4 toward the transmitting position. This second arm portion 62b abuts the side surface of the roller 4. The angle between this pair of arm portions 62 when attached is wider than the angle when free.

Although each embodiment of the present invention has been presented heretofore, the present invention is not limited to the embodiments, and various modifications can be made without departing from the scope of the invention.

For example, in the embodiment described above, the outer ring 2 is non-rotatably attached around the rotational axis O, although the outer ring 2 may be rotatable around the rotational axis O. In this embodiment, when the rollers 4 move to the transmitting position, the power of the inner ring 3 is transmitted to the outer ring 2, and the inner ring 3 and the outer ring 2 are integrally rotated.

What is claimed is:

1. A roller clutch for a fishing reel, comprising:
an outer ring including a radially inner side;
an inner ring disposed on the radially inner side of the outer ring;
a roller disposed between the inner ring and the outer ring, and configured to move between a transmitting position to transmit power between the outer ring and the inner ring and a non-transmitting position to prevent transmission of the power;
a torsion spring configured to bias the roller toward the transmitting position; and
a housing member having a housing hole housing the torsion spring, the housing hole being defined by an inner wall surface, the inner wall surface supporting the torsion spring on an outer surface thereof.

2. The roller clutch for a fishing reel according to claim 1, wherein
the housing hole having a bottom surface that is a flat surface.

3. Tire roller clutch for a fishing reel according to claim 1, wherein
the inner wall surface of the housing hole is continuous.

4. The roller clutch fix a fishing reel according to claim wherein
the torsion spring comprises a coil portion and first and second arm portions extending from the coil portion, and
the housing hole comprises a cylindrical portion that houses the coil portion and an extending portion that extends from the cylindrical portion and houses the first arm portion.

5. The roller clutch for a fishing reel according to claim 1, wherein
the outer ring is disposed so as to seal an opening end surface of the housing hole.

6. A roller clutch for a fishing reel, comprising:
an outer ring including a radially inner side;
an inner ring disposed on the radially inner side of the outer ring;
a plurality of rollers disposed between the inner ring and the outer ring, and configured to move between a transmitting position to transmit power between the outer ring and the inner ring and a non-transmitting position to prevent transmission of the power;
a plurality of torsion springs configured to bias the plurality of rollers toward the transmitting position; and
a housing member having a plurality of housing holes housing a respective torsion spring of the plurality of torsion springs, each of the plurality of housing holes being defined by an inner wall surface, each of the inner wall surfaces supporting the respective torsion spring on an outer surface thereof.

7. The roller clutch for a fishing reel according to claim 6, wherein
each of the plurality of housing holes having a bottom surface that is a flat surface.

8. The roller clutch for a fishing reel according to claim 6, wherein
the inner wall surface of each of the housing holes is continuous.

9. The roller clutch for a fishing reel according to claim 6, wherein
each of the plurality of torsion springs comprises a coil portion and first and second arm portions extending from the coil portion, and
each of the plurality of housing holes comprises a cylindrical portion that houses a respective coil portion and an extending portion that extends from the cylindrical portion and houses a respective first arm portion.

10. The roller clutch for a fishing reel according to claim 6, wherein
the outer ring is disposed so as to seal an opening end surface of the housing hole.

* * * * *